United States Patent [19]

Coran

[11] Patent Number: 4,687,810
[45] Date of Patent: Aug. 18, 1987

[54] MAKING RUBBER BLENDS OF DIENE RUBBER & EPR OR EPDM

[75] Inventor: Aubert Y. Coran, Akron, Ohio

[73] Assignee: Monsanto Company, St. Louis, Mo.

[21] Appl. No.: 815,495

[22] Filed: Jan. 2, 1986

[51] Int. Cl.$^4$ .......................... C08L 13/00; C08L 9/00; C08L 23/26; C08L 51/04

[52] U.S. Cl. .......................... 525/74; 525/72; 525/73; 525/75; 525/76; 525/77; 525/78; 525/79; 525/84; 525/87; 525/193; 525/194; 525/195; 525/196; 525/211; 525/232; 525/237

[58] Field of Search ................. 525/193, 194, 74, 232, 525/87, 75

[56] References Cited

U.S. PATENT DOCUMENTS

| | | | |
|---|---|---|---|
| 2,993,821 | 7/1961 | Ganberg et al. | 525/193 |
| 3,037,954 | 6/1962 | Gessler et al. | 260/29.8 |
| 3,344,105 | 9/1967 | McDonel et al. | 525/193 |
| 3,657,393 | 4/1972 | Komuro et al. | 260/887 |
| 3,806,558 | 4/1974 | Fischer | 260/897 |
| 4,004,627 | 1/1977 | Sandstrom | 525/193 |
| 4,089,820 | 5/1978 | Wright | 525/193 |
| 4,130,535 | 12/1978 | Coran et al. | 260/33.6 |
| 4,202,801 | 5/1980 | Petersen | 525/232 |
| 4,209,596 | 6/1980 | Hashimoto et al. | 525/194 |
| 4,212,787 | 7/1980 | Matsuda et al. | 525/232 |
| 4,278,572 | 7/1981 | Coran et al. | 525/902 |
| 4,316,971 | 2/1982 | Rim et al. | 525/310 |
| 4,480,074 | 10/1984 | Wang | 525/194 |
| 4,554,316 | 11/1985 | Sakano et al. | 525/74 |

*Primary Examiner*—Carman J. Seccuro
*Attorney, Agent, or Firm*—Gordon B. Seward

[57] ABSTRACT

A rubber blend is produced by masticating a mixture of monoolefin copolymer rubber and high-diene hydrocarbon rubber while dynamically vulcanizing the monoolefin copolymer rubber. The blend is then further treated to vulcanize the high-diene hydrocarbon rubber portion. The resulting vulcanized blend has improved properties.

6 Claims, No Drawings

MAKING RUBBER BLENDS OF DIENE RUBBER & EPR OR EPDM

BACKGROUND OF THE INVENTION

This invention relates to a process for making blends of monoolefin rubber and high-diene hydrocarbon rubber and to blends produced thereby.

Monoolefin rubber, typified by terpolymers of ethylene, propylene and a minor portion of diene monomer (EPDM rubber) has particularly good resistance to the degrading effects of oxygen or ozone, among other good properties. In other respects, however, unvulcanized monoolefin rubber has poor tack properties and is consequently unsuited to the production of built-up molded articles such as tires wherein assembly of uncured components requires good tack.

A high-diene hydrocarbon rubber, such as natural and synthetic polyisoprene, polybutadiene and copolymers of butadiene with other monomers such as styrene, has better tack, but is comparatively more susceptible to oxygen and ozone degradation, probably because of the relatively high number of double-bonds in its molecular backbone.

Blends of monoolefin rubber (e.g., EPDM) with high-diene rubber (e.g., natural rubber) appeared to be the answer to the search for a rubbery material which would combine the good properties of each component. Unfortunately, simple blends of these two materials have not proved to be successful, except those in which only a small amount of one or the other type of rubber was present. Thus, if enough EPDM rubber is used to give good ozone resistance, because of fundamental dissimilarities in the two types of rubber, blends of significant amounts of one with another result in heterogeneous mixtures with poor properties. The two types of rubber can be said to be "technologically incompatible," differing in such properties as unvulcanized-state viscosity, surface energy, and vulcanization rate.

The various methods of attempting to resolve this technological incompatability between monoolefin copolymer rubber and high-diene hydrocarbon rubber have all left something to be desired. Such methods include (1) using special vulcanization systems and special accelerators to try to achieve optimum vulcanization of both phases, (2) making EPDM rubber with significantly higher diene content, (3) modifying EPDM rubber, by using a variety of techniques, in an effort to increase its vulcanization rate and (4) prevulcanizing EPDM rubber before blending high-diene hydrocarbon rubber with it.

All of these methods have produced some improvements in the properties of the blends; in most instances the improvements were not sufficient to justify their cost.

Accordingly, a blend of monoolefin copolymer rubber and high-diene rubber which would have the good properties of each component is still unrealized by the industry. One application to which such blends are most suited is in tire sidewalls, where the maximum resistance to oxidation, and especially ozone attack, is needed, and yet good processability and low hysteresis are also prerequisites.

SUMMARY OF THE INVENTION

It has now been discovered that a blend having the good properties of both monoolefin rubber and high-diene rubber can be produced by masticating a mixture of (A) monoolefin copolymer rubber, (B) high-diene hydrocarbon rubber and a vulcanizing agent capable of vulcanizing (A) but not (B), said masticating being performed at vulcanization temperature for (A) until (A) is vulcanized, the ratio of (A) to (B) in the mixture not being so high as to produce an unprocessable blend.

In the blends of the invention, the particle size of the vulcanized monoolefin copolymer is particularly important and critical. It is necessary, first of all, that the vulcanized monoolefin copolymer portion be present as discrete particles, rather than continuous strands or sheets, forming large zones or globules of relatively undispersed rubber. Studies have shown that in blends of significant portions of EPDM rubber with high-diene hydrocarbon rubbers (such as natural rubber, polybutadiene or SBR rubber), the EPDM is dispersed well into the other rubber, in particles which are on the order of from less than one $\mu$m up to about 10 $\mu$m. (J. E. Callan, W. M. Hess and C. E. Scott, Rubber Chem. Technol. 44, 815 (1971)) The small, discrete particles, which are the disperse phase in the blends of the invention, permit the blends to exhibit the characteristic properties of the continuous phase, which is high-diene hydrocarbon rubber, yet retain some of the properties of the monoolefin copolymer rubber.

In a preferred method, the blends of the invention can be made by mixing monoolefin copolymer rubber, a selective vulcanization agent therefor (said vulcanizing agent for the monoolefin copolymer rubber not being effective as a vulcanizing agent for the high-diene rubber under the conditions of mixing and mastication), high-diene hydrocarbon rubber and, optionally, other ingredients and masticating the mixture at vulcanizing temperature for the monoolefin copolymer rubber until the monoolefin rubber is vulcanized, wherein the ratio of the amount of monoolefin rubber to high-diene hydrocarbon rubber in the mixture is not so high as to produce an unprocessable blend. The process is called selective dynamic vulcanization, since only one of the rubbers is vulcanized during the mixing (in the dynamic state rather than static state).

In the process of the invention, monoolefin copolymer rubber means a rubbery polymer from monomers comprising ethylene or propylene and at least one other alpha olefin of the formula $CH_2=CHR$ in which R is alkyl of 1–12 carbon atoms, and from none to a minor portion of one or more copolymerizable dienes.

Suitable monoolefin copolymer rubber comprises largely non-crystalline, rubbery copolymer of two or more alpha monoolefins, preferably copolymerized with at least one polyene, usually a diene. However, saturated monoolefin copolymer rubber, commonly called "EPM" rubber, can be used, for example, copolymers of ethylene and propylene. Examples of unsaturated monoolefin copolymer rubber, commonly called "EPDM" rubber, which are satisfactory comprise the products from the polymerization of monomers comprising two monoolefins, generally ethylene and propylene, and a lesser quantity of non-conjugated diene. Suitable alpha monoolefins are illustrated by the formula $CH_2=CHR$ in which R is hydrogen or alkyl of 1–12 carbon atoms, examples of which include ethylene, propylene, 1-butene, 1-pentene, 1-hexene, 2-methyl-1-propene, 3-methyl-1-pentene, 4-methyl-1pentene, 3,3-dimethyl-1-butene, 2,4,4-trimethyl-1-pentene, 5-methyl-1-hexene, 4-ethyl-1-hexene and others. Satisfactory non-conjugated dienes include straight chain dienes such as 1,4-hexadiene, cyclic dienes such as cyclooctadiene and bridged cyclic dienes such as ethylidenenorbornene and dicyclopentadiene.

Monoolefin rubbers in blends of the invention are vulcanized. The ASTM D 1566 definition of vulcanization is: "an irreversible process during which a rubber compound through a change in its chemical structure (for example, crosslinking), becomes less plastic and more resistant to swelling by organic liquids while elastic properties are conferred, improved, or extended over a greater range of temperature."

The high diene hydrocarbon rubbers in the blends of the invention are essentially random, noncrystalline, rubbery homopolymers from diolefin monomers or copolymers the major components of which are derived from diolefins. The high diene rubber can be a natural polymer, such as Hevea or guayule, or a synthetic polymer. Examples of suitable high diene rubbers include natural rubber, synthetic polyisoprene, polybutadiene, and copolymers of isoprene or butadiene with one or more other copolymerizable monomers such as styrene, alpha methyl styrene, and isobutylene. Of these materials, natural (e.g. Hevea) rubber, synthetic polyisoprene rubber, polybutadiene and SBR (styrene/butadiene rubber) rubber are preferred. Mixtures of two or more high diene hydrocarbon rubbers can be used.

The blends produced by the process of the invention are, by definition, processable, so the amount of particulate, vulcanized monoolefin copolymer rubber cannot be so great as to result in an unprocessable blend. By "processable" is meant capable of being processed in ordinary rubber processing equipment, such as extruders, calenders or the like. Examples of unprocessable rubber compounds are those which are insufficiently cohesive, forming particulate or "crumbly" masses which cannot be handled. The blends must be capable of extrusion to produce extrudate preforms, or be capable of forming a continuous sheet on a calender or roll mill. Preferred blends will contain from 5 to 80% by weight, based on the total weight of both rubbers in the blend, of monoolefin copolymer rubber. More preferred blends contain from 20 to 60% by weight of monoolefin copolymer rubber.

In addition to the rubbers, the blends produced by the process of the invention may also contain other ingredients, such as antidegradants, vulcanization systems (such as sulfur and accelerators), extender oils, plasticizers, softeners, processing aids, waxes, pigments and fillers. Antidegradants include antioxidants and antiozonants. There are many types of antidegradants recommended for use in rubber, depending on the type of rubber and on the service conditions to be encountered. Vulcanization systems can include any materials or combinations of materials which are used to produce cross-links in the rubber. Since the monoolefin copolymer rubber in the blend is vulcanized, the blend can, of course, include residues from its vulcanization system. Also, vulcanization systems for the high diene hydrocarbon rubber can be present, such as sulfur, accelerators and zinc oxide, if the high-diene hydrocarbon rubber portion of the blend is to be subsequently vulcanized, as is usually the case. Alternatively, other vulcanization systems can be used, such as the phenolic curatives, urethane curatives and sulfur-donor curatives as described in U.S. Pat. No. 4,271,049, columns 4 and 5, the disclosure of which is hereby incorporated by reference.

Fillers which can be present include carbon black, clay, talc, calcium carbonate, feldspar, aluminum trihydrate and any other filler materials normally added to rubber. Oils, either parafinic or naphthenic can be present in the blends, if desired. Colorants, such as pigments or dyes can be present as well. Minor portions of unvulcanized monoolefin rubber can also be present.

In the process of the invention, a mixture of the monoolefin copolymer rubber and the high-diene hydrocarbon rubber is masticated in the presence of a selective vulcanizing agent which acts essentially only upon the monoolefin copolymer rubber (and, optionally, other ingredients), at vulcanization temperature for the monoolefin copolymer rubber until the monoolefin copolymer rubber is vulcanized. Since vulcanization is normally both time- and temperature-sensitive, and affected by the relative proportions of the monoolefin copolymer rubber and its selective vulcanizing agent, these parameters and proportions can be adjusted to optimize both the process and the properties of the blend thus produced.

The degree of vulcanization achieved in the process can be controlled by varying the conditions, as previously stated. However, a sufficient level of vulcanization must be attained so that, when the high-diene hydrocarbon rubber is also vulcanized (in a subsequent step), the blend will attain properties which are improved in comparison with similar blends in which the selective dynamic vulcanization process was not used. The particular property or properties which will be improved will be based on the particular selection of materials used in a given blend. Further, in the process of the invention, a blend of a monoolefin copolymer rubber and a high-diene hydrocarbon rubber is obtained which blend, when finally vulcanized in a subsequent step, possesses properties improved over those of vulcanizates made of the high-diene hydrocarbon rubber alone. In addition, rubber compounds made from the blends have, when finally vulcanized, exhibit improved properties over known mixtures of the monoolefin copolymer rubber and the high-diene rubber which are statically cured together.

In the process of the invention, the proportions of the two rubbers must be chosen so that the blend is processable. As previously indicated, "processable" means, simply, that the blend must be capable of being processed on standard rubber-processing equipment, such as roll-mills, calenders or extruders so as to produce preforms which can be subsequently cured in a mold or autoclave to produce finished rubber articles. Ordinarily, the monoolefin copolymer rubber, which is vulcanized in the process, will not comprise more than about 60% by weight, based on the total weight of both rubbers. However, it is possible for a processable blend to comprise as much as 80% vulcanized monoolefin rubber based on the total weight of the rubber. More usually, the blend will contain 50% or less of the monoolefin copolymer rubber (on the same basis), and at least about 20% of the monoolefin copolymer rubber. Amounts higher than the operable range may give blends which have insufficient cohesiveness to process well. Amounts of monoolefin copolymer rubber which are less than about 5% will give blends wherein the improved properties are not realized.

As discussed above, in connection with the compositions of the invention, other ingredients may also be present. This is true of the process of the invention, as well, and fillers, oils and colorants and other normal compounding ingredients can be present during the process. However, vulcanizing ingredients for the high-diene hydrocarbon rubber should not be present during the process of vulcanizing the monoolefin copolymer unless they are ineffective at the mixing temperature. The monoolefin copolymer rubber portion of the blend is vulcanized in the process of the invention, but the high-diene hydrocarbon rubber portion is not.

When the process is complete, however, the blend thus produced can be, and often is, further put to use by incorporating therein vulcanizing ingredients for the high-diene hydrocarbon rubber and then statically vulcanizing this mixture in the shape of a finished part, e.g. in a mold or autoclave. Typically, the blend produced by the process of the invention will be further compounded with vulcanizing ingredients (e.g. sulfur, accelerator, etc.) for the high-diene hydrocarbon rubber, shaped into its finished form, as in a mold, and vulcanized to form a finished article, such as a pneumatic tire, belt, hose or other article. In its final (fully vulcanized) form, the improved properties of the compositions containing the blend are then realized.

PREFERRED EMBODIMENTS OF THE INVENTION

A particularly preferred embodiment of the invention involves a blend of cured EPDM rubber dispersed in natural rubber. EPDM rubber has outstanding resistance to degradation from oxygen or ozone attack, and natural rubber has excellent stress-strain, and hysteresis properties when vulcanized, and excellent tack and green strength in its unvulcanized state.

In order to make such a blend by the process of the invention it is necessary to modify the EPDM rubber so that it can be vulcanized in the presence of natural rubber without the natural rubber itself being vulcanized. A preferred method of modifying the EPDM rubber is to treat it with maleic anhydride (or a derivative thereof) so as to engraft a pendant succinic anhydride functionality on molecules of the EPDM rubber. To facilitate this reaction, a free-radical generating material is effective, for example, benzothiazolyl disulfide (MBTS).

Of course, other treatments can be used to modify the EPDM rubber so as to attach functional groups to it which are available for cross-linking, to permit vulcanization of the EPDM rubber. Other functional groups useful for selective-vulcanization sites on the monoolefin rubber molecules include carboxyl groups, sulfonic acid groups, halogen atoms (especially allylic), amino groups, hydroxyl groups, ester groups, mercapto groups, aldehyde groups, keto groups, epoxide groups, maleimide-derived groups, acrylic-derived groups, maleamic acid- and substituted maleamic acid-derived groups, phenolic groups, etc. Each of these groups can be used in conjunction with an appropriate vulcanization system which normally does not readily vulcanize high-diene rubbers at the temperature of the process of the invention.

Attempts to vulcanize EPDM rubber in a mixture with natural rubber by using conventional sulfur vulcanization techniques, would result in the faster-reacting natural rubber quickly consuming all or most of the vulcanizing agents, leaving the slower-reacting EPDM rubber either partially or almost totally unvulcanized. If extra vulcanizing agents (i.e., sulfur and accelerators) were employed, the natural rubber portion of the mixture would merely overcure, with a resultant loss in most of its properties.

Where the EPDM is first "functionalized," by grafting maleic anhydride-derived groups thereon, it can then be vulcanized in a blend with natural rubber by adding a material which reacts with the pendant succinic anhydride or acid groups and crosslinks the EPDM rubber without significantly affecting the natural rubber. Cross-linking materials effective for this purpose include metal oxides, such as zinc oxide, calcium oxide, magnesium oxide, and diamines.

EXAMPLE I

In order to investigate the properties of blends according to the invention, a series of experimental rubber mixtures was prepared and tested according to the following description, in which all parts are by weight unless otherwise noted.

For convenience, a number of materials are expressed in abbreviated form, as follows:

| Abbreviated Designation | Material |
| --- | --- |
| EPDM | Terpolymer of ethylene, propylene and ethylidene-norbornene sold by Copolymer Corporation under the trademark "Epsyn 70A" |
| SMR 5 | Natural rubber |
| Black | N 326 Carbon Black |
| Oil | Extender oil sold by Sun Oil Co. under the trademark "Circosol 4240" |
| Accelerator | N—(t-butyl)-2-benzothiazolyl sulfenamide |
| Antidegradant | N—(1,3-dimethylbutyl)-N'—phenyl-p-phenylenediamine |

Modified EPDM rubber (MEPDM) was first prepared by mixing the following ingredients in a BR Banbury mixer: 950 g EPDM., 19 g maleic anhydride and 1.9 g benzothiazyl disulfide (MBTS). The ingredients were mixed at high speed until the indicated stock temperature was 232°–260° C. Mixing was then continued at the appropriate speed so as to maintain the desired temperature range, for a period of 5 minutes. The stock temperature was 232° C. at dump.

Three master batches were then prepared in the OO Banbury mixer according to the following recipes:

| Ingredient | MEPDM | UEPDM | UNR |
| --- | --- | --- | --- |
| Modified EPDM | 2000 | — | — |
| EPDM | — | 2000 | — |
| SMR-5 | — | — | 2000 |
| Black | 1000 | 1000 | 1000 |
| Oil | 200 | 200 | 200 |

TABLE I

| Stock No. | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| Modified EPDM | — | — | 10 | — | 20 | — | 30 | — | 40 | — | 50 | — |
| EPDM | — | — | — | 10 | — | 20 | — | 30 | — | 40 | — | 50 |
| SMR 5 | 100 | 100 | 90 | 90 | 80 | 80 | 70 | 70 | 60 | 60 | 50 | 50 |
| Black | 50 | 50 | 50 | 50 | 50 | 50 | 50 | 50 | 50 | 50 | 50 | 50 |

TABLE I-continued

| Stock No. | 1 | 2 | 3 | 4 | 5 | 6 | 7 | 8 | 9 | 10 | 11 | 12 |
|---|---|---|---|---|---|---|---|---|---|---|---|---|
| Oil | 10 | 10 | 10 | 10 | 10 | 10 | 10 | 10 | 10 | 10 | 10 | 10 |
| Zinc Oxide | 5.5 | 5.5 | 5.5 | 5.5 | 5.5 | 5.5 | 5.5 | 5.5 | 5.5 | 5.5 | 5.5 | 5.5 |
| Stearic Acid | 2 | 2 | 2 | 2 | 2 | 2 | 2 | 2 | 2 | 2 | 2 | 2 |
| Sulfur | 2 | 2 | 2 | 2 | 2 | 2 | 2 | 2 | 2 | 2 | 2 | 2 |
| Accelerator | 0.5 | 0.5 | 0.5 | 0.5 | 0.5 | 0.5 | 0.5 | 0.5 | 0.5 | 0.5 | 0.5 | 0.5 |
| Antidegradant | — | 2 | — | — | — | — | — | — | — | — | — | — |
| Uncured Properties | | | | | | | | | | | | |
| Tack, MPa | 0.40 | 0.44 | 0.42 | 0.43 | 0.43 | 0.38 | 0.41 | 0.43 | 0.41 | 0.41 | 0.34 | 0.36 |
| Green Strength (stress at 400% strain) MPa | 0.30 | 0.32 | 0.56 | 0.29 | 0.77 | 0.28 | 1.38 | 0.33 | 2.05 | 0.38 | 2.62 | 0.42 |
| Oscillating Disk Rheometer 153° C. | | | | | | | | | | | | |
| $t_2$, min. | 7.0 | 6.0 | 6.7 | 6.6 | 6.8 | 6.5 | 6.6 | 6.4 | 6.6 | 6.7 | 7.5 | 7.3 |
| $t_{90}$, min | 14.7 | 14.6 | 15.6 | 15.4 | 16.6 | 16.7 | 18.8 | 17.2 | 20.0 | 19.0 | 25.5 | 21.4 |
| Rmax, in-lb | 29.3 | 26.1 | 30.6 | 29.6 | 31.5 | 30.6 | 33.4 | 32.0 | 35.5 | 36.2 | 38.4 | 34.1 |
| Rmin, in-lb | 5.5 | 5.8 | 6.1 | 5.2 | 6.6 | 5.6 | 8.4 | 6.3 | 10.6 | 7.5 | 12.9 | 8.5 |
| Mooney Scorch, 121° C. | | | | | | | | | | | | |
| $t_5$, min. | 44.4 | 37.4 | 46.9 | 42.6 | 47.5 | 39.6 | 44.0 | 41.1 | 46.0 | 36.9 | 44.6 | 34.2 |
| $t_{35}$, min. | 49.8 | 40.8 | 52.5 | 48.1 | 53.6 | 45.5 | 49.6 | 48.3 | 51.0 | 44.6 | 48.8 | 44.3 |
| Min. visc. | 33.6 | 37.4 | 36.1 | 32.9 | 36.3 | 33.0 | 42.7 | 38.0 | 52.3 | 45.8 | 64.2 | 54.4 |

TABLE II

| Stock No. | 1 | 2 | 3 | 4 | 5 | 6 | 7 | 8 | 9 | 10 | 11 | 12 |
|---|---|---|---|---|---|---|---|---|---|---|---|---|
| Cure Time, at 153° C., min. | 25 | 25 | 25 | 25 | 30 | 25 | 30 | 30 | 35 | 35 | 45 | 40 |
| Hardness, Shore A | 58 | 56 | 60 | 61 | 61 | 63 | 62 | 63 | 63 | 65 | 66 | 65 |
| Modulus @ 100%, MPa | 1.71 | 1.60 | 1.72 | 1.74 | 1.88 | 1.84 | 1.86 | 2.02 | 2.05 | 2.01 | 2.35 | 2.00 |
| Modulus @ 200%, MPa | 4.27 | 4.13 | 4.07 | 4.14 | 4.42 | 4.81 | 4.15 | 4.34 | 4.60 | 3.99 | 5.35 | 3.63 |
| Modulus @ 300%, MPa | 8.33 | 8.02 | 8.00 | 7.92 | 8.40 | 7.57 | 8.00 | 7.65 | 8.69 | 6.72 | 10.1 | 5.83 |
| Ultimate Tensile, MPa | 24.0 | 25.2 | 24.2 | 20.7 | 23.3 | 17.1 | 23.3 | 14.8 | 22.4 | 13.2 | 22.4 | 11.4 |
| Ult. Elong.,% | 588 | 633 | 595 | 569 | 592 | 532 | 602 | 500 | 578 | 528 | 530 | 536 |
| After 24 hours Aging @ 100° C. | | | | | | | | | | | | |
| Hardness, Shore A | 52 | 58 | 53 | 55 | 55 | 58 | 56 | 60 | 58 | 61 | 61 | 63 |
| Modulus @ 100%, MPa | 1.73 | 2.21 | 1.87 | 1.95 | 1.79 | 1.98 | 1.92 | 2.04 | 2.01 | 2.00 | 2.25 | 2.02 |
| Modulus @ 300%, MPa | 7.88 | 10.86 | 8.59 | 8.29 | 7.98 | 7.82 | 8.40 | 7.16 | 8.68 | 5.34 | 9.86 | 5.30 |
| Ult. Ten., MPa | 12.0 | 25.9 | 12.4 | 11.9 | 13.2 | 12.2 | 12.3 | 10.0 | 13.7 | 9.5 | 13.4 | 8.6 |
| Ult. Elong., % | 405 | 573 | 396 | 399 | 430 | 415 | 392 | 406 | 414 | 443 | 371 | 526 |

TABLE III

| Stock No. | 1 | 2 | 3 | 4 | 5 | 6 | 7 | 8 | 9 | 10 | 11 | 12 |
|---|---|---|---|---|---|---|---|---|---|---|---|---|
| Compression Set-% (22 hr. @ 100° C.) | 46 | 46 | 50 | 47 | 46 | 53 | 52 | 48 | 51 | 46 | 47 | 46 |
| Rebound, % | 70 | 70.5 | 70.5 | 69.5 | 70.5 | 71 | 72 | 70.5 | 73.5 | 71.5 | 74 | 71.2 |
| Torsional Hysteresis, % | 17 | 16 | 15 | 18 | 14 | 19 | 14 | 21 | 13 | 20 | 13 | 21 |
| Tensile Set, % | 1.0 | 1.0 | 1.0 | 1.5 | 2.0 | 2.5 | 3.0 | 4.0 | 2.5 | 4.5 | 2.5 | 6.0 |
| Fatigue to Failure | | | | | | | | | | | | |
| Constant Strain (100%) Kilocycles | 38 | 181 | 38 | 33 | 41 | 29 | 46 | 25 | 52 | 20 | 41 | 17 |
| Constant Energy (10 kg/cm$^2$) Kilocycles | 21 | 90 | 27 | 21 | 34 | 18 | 41 | 18 | 42 | 12 | 60 | 8 |
| Tear Resistance | | | | | | | | | | | | |
| Room Temp., Lb-Ft/in | 457 | 346 | 491 | 432 | 342 | 265 | 340 | 243 | 327 | 230 | 329 | 240 |
| 100° C. Lb-Ft/in | 322 | 342 | 292 | 392 | 290 | 249 | 256 | 142 | 244 | 120 | 174 | 100 |
| Goodrich Flexometer | | | | | | | | | | | | |
| Delta T, °C. | 57 | 49 | 50 | 74 | 58 | 70 | 74 | 70 | 66 | 70 | 56 | 68 |
| Running time, min. | 30 | 30 | 30 | 30 | 30 | 30 | 30 | 30 | 30 | 30 | 28 | 17 |
| Set, % | 22.7 | 21.4 | 23.5 | 30.7 | 25.6 | 32.4 | 28.6 | 28.6 | 28.0 | 27.7 | — | — |

TABLE IV

| Stock No. | 1 | 2 | 3 | 4 | 5 | 6 | 7 | 8 | 9 | 10 | 11 | 12 |
|---|---|---|---|---|---|---|---|---|---|---|---|---|
| Ozone Resistance 25 pphm Ozone, Time to 20% loss of apparent modulus (@ 100% Elongation), Hours - | | | | | | | | | | | | |
| static | 19 | 55 | 12 | 12 | 17 | 41 | >304 | >304 | >304 | >304 | >304 | >304 |
| dynamic | 19 | 87 | 17 | 15 | 22 | (24) | (74) | (184) | >304 | (296) | >304 | >304 |
| intermittent | 12 | 59 | 12 | 10 | 11 | 24 | (88) | (136) | >304 | >304 | >304 | >304 |
| Ozone Resistance | | | | | | | | | | | | |
| 50 pphm Ozone, Hours | 1 | 8 | 1 | 1 | 3 | 3 | 6 | 72 | 105 | >485 | >485 | >485 |
| Shell Rating, | | | | | | | | | | | | |
| 174 hrs | | | | | | | | | | | | |
| body | 1 | 5 | 2 | 2 | 2 | 2 | 2 | 10 | 10 | 10 | 10 | 10 |
| edge | 1 | 5 | 2 | 2 | 2 | 2 | 2 | 7 | 4 | 10 | 10 | 10 |
| 485 hrs | | | | | | | | | | | | |
| body | 1 | 3 | 2 | 1 | 1 | 1 | 1 | 10 | 10 | 10 | 10 | 10 |
| edge | 1 | 3 | 2 | 1 | 1 | 1 | 1 | 1 | 2 | 10 | 10 | 10 |

Thus, MEPDM was based on the modified EPDM produced above, UEPDM on unmodified EPDM, and UNR on natural rubber (also unmodified).

Vulcanizable stocks were prepared to give the compositions described in Table I. In each stock, EPDM and natural rubber black masterbatches were mixed for about 2.5 minutes at a speed so as to bring the temperature to about 135° C., then the zinc oxide and stearic acid were added and mixing was continued for about ½ minute. Each batch was then blended on a roll mill, where the sulfur and accelerator were added.

The stocks in Table I are identified on the basis of 100 weight parts of rubber. Stock 1 is an all-natural rubber control with no antidegradant, stock 2 is all natural rubber with 2 parts antidegradant per 100 parts rubber by weight, and the other stocks are blends of various proportions of either modified EPDM rubber or unmodified EPDM rubber with natural rubber, as shown. After mixing, tack and green strength values were determined on each.

Green strength measurements are performed by using a standard tensile testing machine. Samples of the stock to be tested are pressed into slabs approximately three millimeters in thickness, from which slab specimens, measuring about 20.3×2.4 cm, are die-cut. The specimens are bench marked (to a test length of 2.54 cm.) in the center, and the exact width and thickness are measured. Specimens are pulled at a crosshead speed of 50.8 cm. per minute, with the stress recorded at desired levels of elongation up to 1200%, or break. Stress values are calculated based on the original cross-section area of each specimen, and the maximum stress value is also recorded.

Tack measurements are made by using the Monsanto Tel-Tak instrument, as described in an article by J. R. Beatty in Rubber Chemistry and Technology, 42, 1040 (1969). Fabric-backed rubber specimens are cut to a width of 6.35 mm and placed at right angles to give a contact area of 0.403 cm². A contact pressure of 227 grams is used for all tests, with a 30-second dwell time. Sample "stickiness" is measured by substituting a polished stainless steel surface for one specimen, and the result is subtracted from the tack value to give a "true tack" measurement. The units of these measurements are in grams per square centimeter, representing the maximum force per unit area required to separate the specimens, at a separation rate of 2.54 cm. per minute.

Based on the rheometer results the stocks were cured at 153° C. to optimum levels, and the stress-strain and hardness properties of the vulcanizates were measured, both unaged and after aging for 24 hours at 100° C. according to the procedures of ASTM D-412.

The hardness and stress-strain properties are set forth in Table II.

Further testing on cured samples was performed, with the test results set forth in Table III. Compression set testing was done according to ASTM D-395. The rebound test was done according to the description of the Lupke rebound test in the Vanderbilt Rubber Handbook (1958), pages 315, 316. Torsional hysteresis was determined by the method of Mooney and Gerke, Rubber Chem. Tech 14 (1941). Tensile set was performed according to ASTM D-412, with 100% elongation of the T-50 sample for ten minutes, then measurement after ten minutes recovery. The fatigue-to-failure test was run according to ASTM D-4482-85. Tear testing was done according to AsTM D-624, and the Goodrich flexometer results were obtained by the method of ASTM D-623.

The twelve stocks were also tested, after curing, for ozone resistance. First, samples were tested in air containing 25 parts per hundred million (pphm) of ozone. T-50 specimens were measured for modulus at 100% elongation, and then exposed to the ozone atmosphere in static, dynamic and intermittent modes. Test results were reported as the number of hours until a 20% loss in apparent modulus was reached.

Ozone resistance was also measured according to ASTM D-3395 on a belt flexer at a concentration of 50 pphm ozone, with the time to first crack recorded, in hours. Values in parentheses were extrapolated, when samples broke. Samples were also rated by the Shell rating system on a scale of 1 to 10 (with 10 being the highest rating) after 174 hours and 485 hours of exposure.

The ozone test results are summarized in Table IV.

The twelve samples tested represent a comparison of blends of natural rubber with EPDM rubber, and with the modified EPDM rubber in amounts of from ten to fifty percent of the EPDM rubber, together with control samples of 100 percent natural rubber, with and without antidegradant.

The uncured properties (Table I) show a slight loss of tack with increased levels of EPDM rubber, both modified and unmodified, when the EPDM levels reach 50 percent. The green strength increases slightly with increased concentrations of unmodified EPDM, and sharply with increased concentration of modified EPDM.

Rheometer data show that the cure time is slowed with increasing levels of EPDM rubber, and that the viscosity of the stocks increases slightly with increased levels of EPDM. Mooney Scorch data indicate little change in scorch times.

The hardness of cured samples appears to increase with increasing levels of EPDM rubber, modified or unmodified. Aging reduced this difference, so that all samples showed equivalent hardness values after 24 hours at 100° C.

Modulus values drop off with higher levels of unmodified EPDM, but increase slightly as levels of modified EPDM are increased. Stress-strain measurements of aged samples show that the antidegradant provides a marked superiority in retention of ultimate tensile strength.

Turning to Table III, compression set values appear essentially equivalent for all samples, while rebound seems to improve at higher levels of modified EPDM. Torsional hysteresis values appear to increase with increasing levels of unmodified EPDM, and to decrease with increasing levels of modified EPDM. Tensile set increases with increasing levels of both modified and unmodified EPDM, but more sharply with the latter.

The Fatigue to Failure tests demonstrate that the modified EPDM gives a significant improvement with increasing levels, but the unmodified EPDM gives poorer fatigue life with increasing levels. These trends were evident in both the constant-strain testing and the constant-energy testing.

Tear resistance decreased, both at room temperature and at 100° C., with increasing levels of EPDM, although the modified EPDM greatly outperformed the unmodified EPDM.

In Flexometer tests, the temperature rise is increased with increasing levels of EPDM, though the unmodified EPDM gives a greater rate of increase with increases in its concentration. Higher levels of EPDM give increased set values.

Interpreting the ozone data in Table IV, it is immediately apparant that, at levels of 30% or more, EPDM greatly improves ozone resistance of the stocks. This effect is apparent in both modified and unmodified EPDM stocks, although the unmodified EPDM showed a very slightly better performance.

EXAMPLE II

In order to investigate higher levels of EPDM rubber in blends with natural rubber, a series of compounds was prepared following the procedures of Example I. In these compounds, a small amount of hexamethylenediamine (HMD) was added after the modified EPDM was mixed with the natural rubber, as an additional curative for the modified EPDM. Proportions and results are set forth in Table V.

TABLE V

| Stock No. | 13 | 14 | 15 | 16 |
|---|---|---|---|---|
| Modified EPDM | 40 | 60 | 75 | 80 |
| SMR 5 | 60 | 40 | 25 | 20 |
| Black | 50 | 50 | 50 | 50 |
| Oil | 10 | 10 | 10 | 10 |
| HMD | 0.26 | 0.23 | 0.26 | 0.29 |
| Zinc Oxide | 5.5 | 5.5 | 5.5 | 5.5 |
| Sulfur | 2 | 2 | 2 | 2 |
| Accelerator | 2 | 2 | 2 | 2 |
| Cure Time, @ 153° C., Min. | 25 | 30 | 50 | 50 |
| Hardness, Shore A | 45 | 46 | 50 | 52 |
| Modulus @ 200%, MPa | 1.36 | 1.61 | 1.85 | 2.17 |
| Modulus @ 300%, MPa | 2.16 | 2.87 | 3.47 | 4.29 |
| Ult. Tensile, MPa | 18.8 | 5.41 | 4.90 | 4.72 |
| Ult. Elong., % | 647 | 404 | 354 | 314 |
| Tensile set, % | 2.5 | 2.0 | 2.5 | 2.0 |
| Torsional Hysteresis, % | 3.9 | 3.9 | 3.8 | 3.8 |

The physical test results in Table V show that ultimate tensile strength drops significantly as the amount of EPDM rubber reaches 60%. However, the physical properties generally indicate the blends are useful. Ozone tests were not run, as it was assumed that ozone resistance is excellent in blends with higher levels of EPDM rubber.

To summarize the data, in most tests, the blends containing modified EPDM outperformed those containing unmodified EPDM at equal levels. Most significant improvements were noted in respect to fatigue life, tearing resistance and tensile strength. Thus, vulcanizates from the blends of the invention achieved excellent ozone resistance with little or no sacrifice of physical properties.

I claim:

1. The process of producing a rubber blend by masticating a mixture of (A) monoolefin copolymer rubber which is a largely non-crystalline, rubbery copolymer of two or more alpha monoolefins and, optionally, a lesser quantity of a non-conjugated diene, which rubber has been modified to engraft functional groups thereto which provide selective vulcanization cites, (B) high-diene hydrocarbon rubber which is selected from homopolymers of diolefin monomers or copolymers containing a major portion of diolefin monomers and a vulcanizing agent capable of vulcanizing (A) but not (B), said masticating being performed at vulcanizing temperature for (A) until (A) is vulcanized but (B) is not, the ratio of (A) to (B) in the mixture not being so high as to produce an unprocessable blend.

2. The process of claim 1 wherein the weight ratio of (A) to (B) is between 1:10 and 5:1 and wherein A is functionalized.

3. The process of claim 2, wherein the weight ratio of (A) to (B) is between 1:4 and 3:2 and (A) is maleic functionalized.

4. The process of claim 2, wherein the mixture is masticated in an internal mixer.

5. The process of claim 2, and the additional step of admixing vulcanizing agent for (B).

6. The process of claim 5 and the subsequent steps of shaping the blend and vulcanizing (B).

* * * * *